(12) United States Patent
Liu et al.

(10) Patent No.: US 11,140,160 B2
(45) Date of Patent: Oct. 5, 2021

(54) METHOD AND SYSTEM FOR ESTABLISHING INTER-DEVICE COMMUNICATION

(71) Applicant: BANMA ZHIXING NETWORK (HONGKONG) CO., LIMITED, Kowloon (HK)

(72) Inventors: Dunjun Liu, Hangzhou (CN); Kan Dong, Hangzhou (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 134 days.

(21) Appl. No.: 16/050,821

(22) Filed: Jul. 31, 2018

(65) Prior Publication Data

US 2019/0052635 A1 Feb. 14, 2019

Related U.S. Application Data

(63) Continuation-in-part of application No. PCT/CN2017/071832, filed on Jan. 20, 2017.

(30) Foreign Application Priority Data

Feb. 2, 2016 (CN) .......................... 201610072683.0

(51) Int. Cl.
*H04L 9/08* (2006.01)
*H04L 29/06* (2006.01)
*G06F 21/53* (2013.01)
*G06F 21/72* (2013.01)
*H04L 9/00* (2006.01)

(52) U.S. Cl.
CPC .......... *H04L 63/0876* (2013.01); *G06F 21/53* (2013.01); *G06F 21/72* (2013.01); *H04L 9/006* (2013.01); *H04L 9/0825* (2013.01); *H04L 9/0866* (2013.01); *H04L 9/0897* (2013.01); *H04L 63/0428* (2013.01); *H04L 63/0442* (2013.01); *H04L 63/061* (2013.01); *G06F 2221/2107* (2013.01); *H04L 2463/062* (2013.01)

(58) Field of Classification Search
CPC ............... H04L 63/0442; H04L 63/061; H04L 63/0428; H04L 9/0866; H04L 9/0825; H04L 9/006
See application file for complete search history.

(56) References Cited

U.S. PATENT DOCUMENTS 7,467,370 B2  12/2008  Proudler
8,316,228 B2  11/2012  Winslow
9,220,012 B1 *  12/2015  Inamdar ................ H04W 12/08
(Continued)

FOREIGN PATENT DOCUMENTS

CN  101212293  7/2008
CN  101479984  7/2009
(Continued)

*Primary Examiner* — Ali S Abyaneh
(74) *Attorney, Agent, or Firm* — Van Pelt, Yi & James LLP

(57) ABSTRACT

Establishing inter-device communication is disclosed including receiving, using a first device, an encrypted session key sent by a second device, decrypting, based on a private key of the first device, the encrypted session key in a trusted environment to obtain a decrypted session key, and conducting, based on the decrypted session key, data communications with the second device.

36 Claims, 12 Drawing Sheets

(56) References Cited

U.S. PATENT DOCUMENTS

| | | | | |
|---|---|---|---|---|
| 9,584,318 | B1* | 2/2017 | Yang | H04L 63/101 |
| 2006/0177067 | A1* | 8/2006 | Kim | H04L 9/0836 |
| | | | | 380/278 |
| 2008/0077592 | A1* | 3/2008 | Brodie | G06F 21/31 |
| 2008/0226065 | A1 | 9/2008 | Zunke | |
| 2009/0024845 | A1 | 1/2009 | Benshetler | |
| 2011/0098075 | A1 | 4/2011 | Bienas | |
| 2012/0201380 | A1* | 8/2012 | Kohiyama | G06F 21/14 |
| | | | | 380/255 |
| 2015/0043724 | A1* | 2/2015 | Farris | H04M 3/42059 |
| | | | | 379/142.05 |
| 2016/0099814 | A1* | 4/2016 | Negi | H04L 9/3268 |
| | | | | 713/171 |
| 2017/0171179 | A1* | 6/2017 | Buendgen | H04L 63/06 |
| 2018/0343114 | A1* | 11/2018 | Ben-Ari | G06F 21/64 |

FOREIGN PATENT DOCUMENTS

| | | |
|---|---|---|
| CN | 102143487 | 8/2011 |
| CN | 102427449 | 4/2012 |

\* cited by examiner

800

METHOD AND SYSTEM FOR ESTABLISHING INTER-DEVICE COMMUNICATION

CROSS REFERENCE TO OTHER APPLICATIONS

This application is a continuation-in-part of and claims priority to International (PCT) Application No. PCT/CN17/71832 entitled METHOD OF ESTABLISHING COMMUNICATION BETWEEN APPARATUSES, DEVICE, AND SYSTEM, filed Jan. 20, 2017 which is incorporated herein by reference in its entirety for all purposes, which claims priority to China Patent Application No. 201610072683.0 entitled A METHOD, MEANS, AND SYSTEM FOR ESTABLISHING INTER-DEVICE COMMUNICATION filed on Feb. 2, 2016 which is incorporated by reference in its entirety for all purposes.

FIELD OF THE INVENTION

The present invention relates to a method and a system for establishing inter-device communication.

BACKGROUND OF THE INVENTION

Some encrypted communications, e.g., Hyper Text Transfer Protocol over Secure Socket Layer (HTTPS), are used for strengthening the security of inter-device communications. When using HTTPS, a session key is transmitted using a pre-arranged encoding algorithm between a server and a client. However, the session key can be very easily intercepted since the client's processing of the session key always takes place in a normal operating system (OS). Therefore, the encrypted communications' security level decreases considerably when OS loopholes are discovered and the session key is intercepted. The encrypted communications would fail to meet the security needs of background applications such as financial applications. A more secure communication technique is needed.

SUMMARY OF THE INVENTION

The present invention provides a process and a system for establishing inter-device communication.

A process for establishing inter-device communication is provided and comprises:
  receiving, at a first device, an encrypted session key sent by a second device;
  decrypting, based on the first device's private key, the encrypted session key in a trusted environment to obtain a decrypted session key; and
  conducting data communications with the second device using the decrypted session key.

In some embodiments, before the receiving of the encrypted session key sent by the second device, the process further comprises:
  sending the first device's identifying information to the second device so that the second device can determine a first device's public key corresponding to the first device's identifying information, and sending to the first device a session key encrypted using the first device's public key.

In some embodiments, the first device's identifying information is stored in a trusted environment.

In some embodiments, the first device's identifying information is assigned and maintained in advance by an identification service device.

In some embodiments, the identification service device pre-assigns and maintains the first device's public key corresponding to the first device's identifying information and makes the first device's public key available to the second device. In some embodiments, the first device's private key is pre-written into a trusted environment of the first device.

In some embodiments, the first device corresponds to a client device, and the second device corresponds to a server device.

In some embodiments, before the first device receives the encrypted session key sent by the second device, the process further comprises:
  sending, from the first device, the first device's public key to the second device so that the second device can encrypt the session key using the first device's public key to obtain an encrypted session key, and send back the encrypted session key to the first device.

In some embodiments, the first device's public key and the first device's private key are generated by an identification service device and provided to the first device. The first device's private key can be pre-written into a trusted environment of the first device.

In some embodiments, the first device and the second device correspond to client devices.

In some embodiments, the trusted environment includes a trusted chip or a secure environment isolated using a virtualization mechanism.

A process for establishing inter-device communication is further provided and comprises:
  acquiring, at a second device, a first device's public key;
  encrypting the session key with the first device's public key to obtain an encrypted session key, and sending the encrypted session key to the first device;
  conducting data communications with the first device based on the encrypted session key.

In some embodiments, the acquiring of the first device's public key comprises:
  receiving, at the second device, the first device's identifying information;
  acquiring the first device's public key corresponding to the first device's identifying information from an identification service device.

In some embodiments, the process further comprises:
  in response to a determination that the second device receives a response from the identification service device indicating that the first device's identifying information is not legitimate, or a response indicating that the first device's public key corresponding to the first device's identifying information does not exist, sending back to the first device a response indicating a failure to establish communication.

In some embodiments, the first device corresponds to a client device, and the second device corresponds to a server device.

In some embodiments, the acquiring of the first device's public key comprises:
  receiving the first device's public key sent by the first device.

In some embodiments, before the sending of the encrypted session key to the first device, the process further comprises:
  assigning, using the second device, a random session key.

In some embodiments, the assigning of the random session key and the encrypting of the session key are performed by the second device within a trusted environment.

A process for establishing inter-device communication is provided and comprises:

receiving, using an identification service device, the first device's identifying information sent by a second device;

sending back to the second device a first device's public key corresponding to the first device's identifying information so that the second device can encrypt a session key with the first device's public key to obtain an encrypted session key, and send the encrypted session key to the first device, the session key being used for data communication between the first device and the second device.

In some embodiments, the process further comprises:

maintaining, using the identification service device, identifying information pre-assigned to the first device, and maintaining, using the identification service device, the first device's public key and the first device's private key pre-generated for the first device.

In some embodiments, the process further comprises:

pre-writing the first device's private key into a trusted environment of the first device.

In some embodiments, the process further comprises:

sending back to the second device a response indicating that the first device's identifying information is not legitimate in response to a determination that the identification service device determining the first device's identifying information is not legitimate, or the identification service device determining that the first device's public key corresponding to the first device's identifying information does not exist.

A first device for establishing inter-device communication is provided and comprises:

a key receiving unit configured to receive an encrypted session key sent by a second device;

a trusted executing unit configured to decrypt, based on the first device's private key, the encrypted session key in a trusted environment, and conduct data communications between the first device and the second device based on the decrypted session key.

In some embodiments, the first device further comprises:

an ID sending unit configured to send the first device's identifying information to a second device so that said second device can determine a first device's public key corresponding to the first device's identifying information, encrypt a session key based on the first device's public key to obtain an encrypted session key, and send the encrypted session key to the first device.

In some embodiments, the first device further comprises:

a trusted executing unit configured to request and acquire the first device's identifying information.

The trusted executing unit is further configured to acquire, in response to a request sent by the ID sending unit, the first device's identifying information from a secure storage zone and send the first device's identifying information back to the ID sending unit.

In some embodiments, the first device's identifying information is assigned and maintained in advance by an identification service device.

The identification service device pre-generates and maintains a first device's public key corresponding to the first device's identifying information and makes the first device's public key available to the second device.

In some embodiments, the first device's private key is pre-written into a secure storage zone of the first device.

In some embodiments, the first device corresponds to a client device, and the second device corresponds to a server device.

In some embodiments, the first device further comprises:

a public key sending unit configured to send a first device's public key to the second device so that the second device can encrypt a session key using the first device's public key to obtain an encrypted session key, and send the encrypted session key back to the first device.

In some embodiments, the first device's public key and the first device's private key are generated by an identification service device and provided to the first device. In some embodiments, the first device's private key is pre-written into a secure storage zone of the first device.

In some embodiments, the first device and the second device correspond to client devices.

In some embodiments, the trusted executing unit comprises: a trusted chip or a secure module isolated using a virtualization mechanism.

A second device for establishing inter-device communication is provided and comprises:

a public key acquiring unit configured to acquire a first device's public key;

a key processing unit configured to encrypt a session key with the first device's public key to obtain an encrypted session key, and send the encrypted session key to the first device;

a data communication unit configured to conduct data communication between the second device and the first device based on the encrypted session key.

In some embodiments, the public key acquiring unit is configured to:

receive first device's identifying information;

acquire a first device's public key corresponding to the first device's identifying information from an identification service device.

In some embodiments, the second device further comprises:

a response sending unit configured to send back to the first device a response indicating failure to establish communication in response to a determination that the public key acquiring unit receives a response from the identification service device indicating that the first device's identifying information is not legitimate, or a response indicating that a first device's public key corresponding to the first device's identifying information does not exist.

In some embodiments, the first device corresponds to a client device, and the second device corresponds to a server device.

In some embodiments, the public key acquiring unit is configured to receive a first device's public key sent by the first device.

In some embodiments, the first device further comprises:

a key generating unit configured to assign a random session key.

In some embodiments, the key generating unit and the key processing unit are set up in a trusted environment.

An identification service device for establishing inter-device communication is provided and comprises:

a receiving unit configured to receive a first device's identifying information sent by a second device;

a determining unit configured to determine a first device's public key corresponding to the first device's identifying information;

a sending unit configured to send back the first device's public key to the second device so that the second device can encrypt a session key with the first device's public key to obtain an encrypted session key, and send to the first device the encrypted session key, the encrypted session key being for data communication between the first device and the second device.

In some embodiments, the identification service device further comprises:

an information maintaining unit configured to maintain identifying information pre-assigned to the first device and maintain a first device's public key and the first device's private key pre-generated for the first device.

In some embodiments, the sending unit is further configured to send back to the second device a response indicating that the first device's identifying information is not legitimate upon the determining unit determining that the first device's identifying information is not legitimate, or the determining unit determining that the first device's public key corresponding to the first device's identifying information does not exist.

From the technical schemes above, in the present invention, decryption of both the device private key and the session key are performed in a trusted environment, thereby preventing interception of the private key or the session key resulting from OS loopholes and increasing inter-device communication security.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
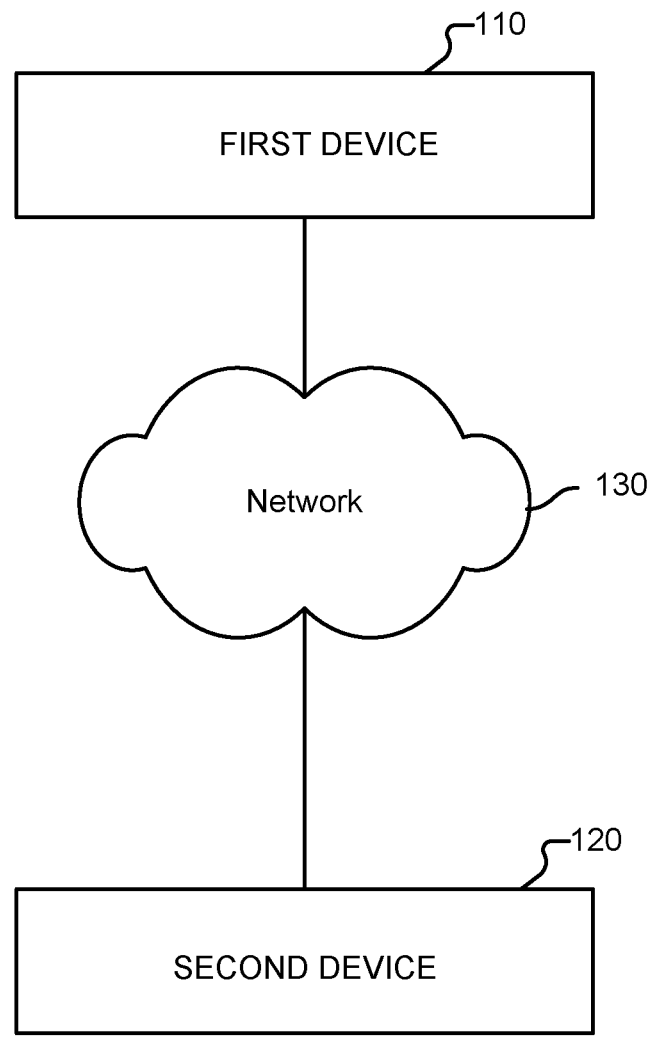
FIG. 1 is a drawing of an embodiment of a system architecture for establishing inter-device communication.

FIG. 1 is a drawing of an embodiment of a system architecture for establishing inter-device communication. In some embodiments, the system architecture 100 includes a first device 110 connected to a second device 120 via a network 130. In one example, the first device 110 is a client device, and the second device 120 is a server device. In other words, secure communication can be established between the client device and the server device. In another example, both the first device and the second device are client devices. In other words, secure communication is established between the client devices.

Client devices can include: smart mobile terminals, smart home devices, network devices, wearable devices, smart medical devices, personal computers (PCs), etc. The smart mobile terminals can include mobile phones, tablets, notebook computers, personal digital assistants (PDAs), etc. The smart home devices can include smart TVs, smart air-conditioners, smart water heaters, smart air purifiers, etc. The network devices can include switches, wireless access points (APs), servers, etc. The wearable devices can include smart watches, smart glasses, smart bracelets, etc. The smart medical devices can include smart thermometers, smart blood pressure monitors, smart blood glucose meters, etc. The servers can include server computers, switches, routers, etc.

Figure 2:
FIG. 2 is a flowchart of an embodiment of a process for establishing inter-device communication.

FIG. 2 is a flowchart of an embodiment of a process for establishing inter-device communication. In some embodiments, the process 200 is implemented by the second device 120 of FIG. 1 and comprises:

In 210, a second device acquires a first device's public key and encrypts a session key based on the first device's public key to obtain an encrypted session key. In some embodiments, encryption techniques such as RSA or elliptic-curve cryptography (ECC) are used.

The second device can acquire the first device's public key from a server. For example, the second device acquires the first device's public key based on the first device's identifying information from an identification service device. For example, the identification service device is a device including a customized database storing identification information of all the devices and public keys. Such a situation can occur when the second device is a server device. In another example, the second device acquires the first device's public key from the first device. Such a situation can occur when the first device is a client device.

The session key can be generated or assigned by the second device. However, to ensure security, the session key is to include a degree of randomness via a random number generator. The session key is used in subsequent data communications between the first device and the second device.

In 220, the second device sends the encrypted session key to the first device.

In 230, the first device decrypts, based on the first device's private key, the encrypted session key to be received in a trusted environment. In other words, the decryption is performed in the trusted environment. In some embodiments, decryption techniques such as RSA or elliptic-curve cryptography (ECC) are used. The trusted environment can be Secure Element (SE), Trusted Execution Environment (TEE), etc.

The first device's private key is stored in a first device's trusted environment, and the encrypted session key is in the trusted environment when the encrypted session key undergoes decryption. The trusted environment can correspond to a hardware component in the first device. The security of the encrypted session key when undergoing decryption is thus ensured. In some embodiments, the trusted environment is a secure zone that has been isolated on hardware using a mechanism such as ARM TrustZone, Secure Element, TI M-Shield, etc. The trusted environment can also be an independent, secure environment isolated using a virtualization mechanism. The virtualization mechanism can be, for example, Hypervisor on ARM. The trusted environment ensures that the deposited first device key will not be altered or erased and ensures the confidentiality of the session key.

In 240, the first device conducts data communications with the second device based on the decrypted session key.

In subsequent data communications between the first device and the second device, both the first device and the second device can use the decrypted session key for data encryption and decryption. For example, when the first device sends data to the second device, the first device first encrypts the data using the decrypted session key and then sends the encrypted data to the second device. The second device uses the decrypted session key to decrypt the data sent by the first device. The encrypting and decrypting can be performed using well-known cryptography algorithms such as Advanced Encryption Standard (AES). Likewise, when sending data to the first device, the second device first encrypts the data using the decrypted session key and then sends the encrypted data to the first device. The first device decrypts the data sent by the second device based on the decrypted session key.

The following examples relate to a client device establishing secure communication with a server device, and a client device establishing secure communication with another client device.

Figure 3:
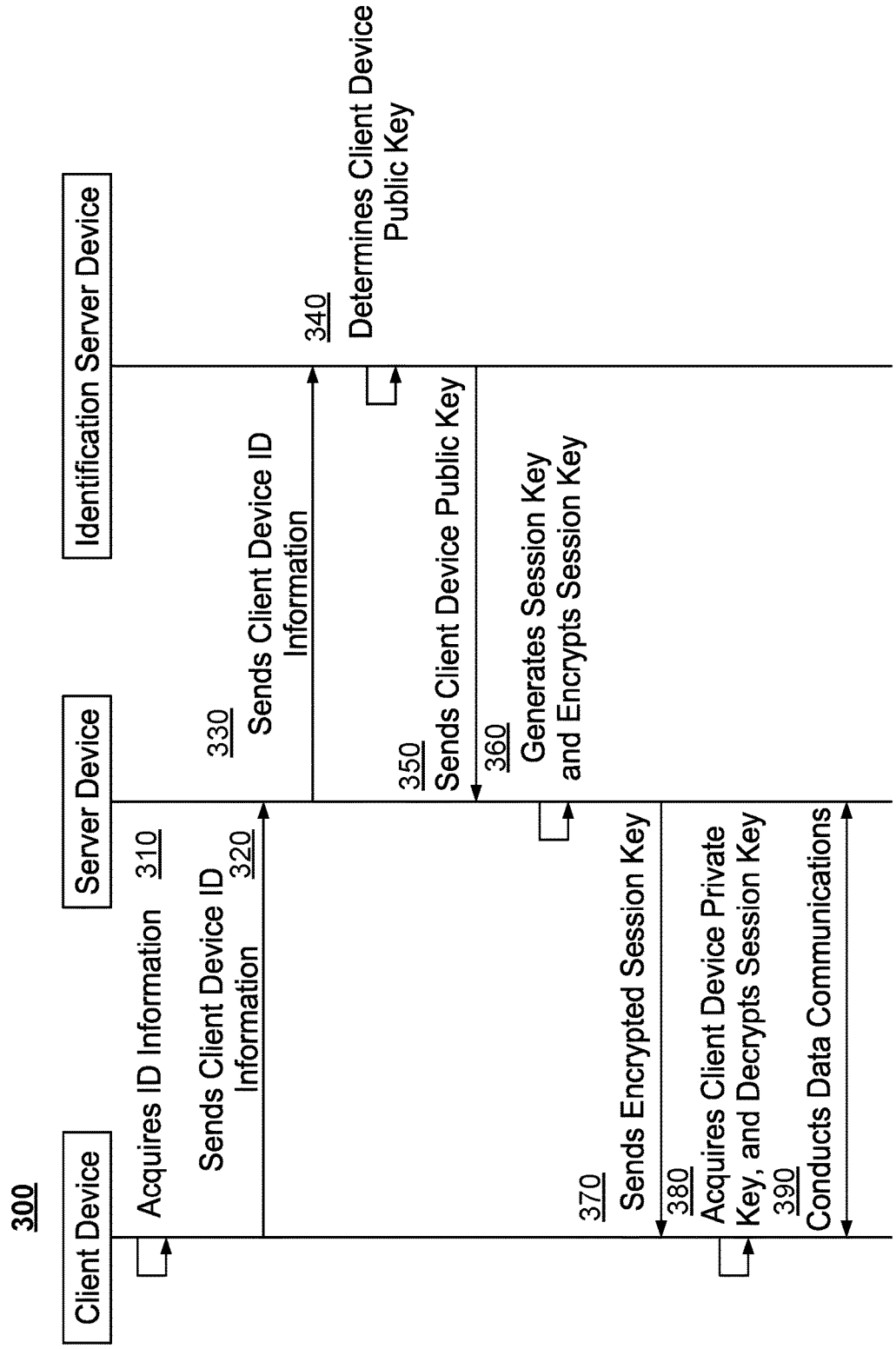
FIG. 3 is a flowchart of another embodiment of a process for establishing inter-device communication.

FIG. 3 is a flowchart of another embodiment of a process for establishing inter-device communication. In some embodiments, the process 300 is performed by a client device 110 or 120 of FIG. 1 and comprises:

In 310, the client device acquires its own identification (ID) information.

In some embodiments, the client device's ID information used to uniquely identify the client device includes an International Mobile Equipment Identity (IMEI), a media access control (MAC) address, etc. In some embodiments, the client device's ID is assigned by an identification service and provided to the client device. In some embodiments, the identification service is located on an identification service device at the server device side or the cloud side. For example, the client device's ID is provided to an ID-writing device during the client device's factory shipment stage, and the ID-writing device writes the client device ID into the client device.

To keep the client device ID information secure, the client device ID information can be stored in a secure environment, such as a secure storage zone, to ensure that the ID information is not changed.

Operation 310 can be triggered when the client device is to establish a communication connection with a server device. Operation 310 can also be triggered by the server. For example, operation 310 is performed when the client device receives a connection request from the server device.

In 320, the client device sends client device ID information to a server device.

In 330, the server device sends the client device ID information to an identification service device to request a client device public key from the identification service device.

In some embodiments, the server device acquires the client device public key from the identification service device based on the client device ID information.

In 340, the identification service device determines the client device public key corresponding to the client device ID information.

In some embodiments, the identification service device is responsible for centrally maintaining correspondences between client device ID information and client device public keys. These correspondences can be pre-stored to the identification service device.

In some embodiments, a legitimate client device's ID information is assigned and maintained by the identification service device. Moreover, the legitimate client device's ID information can be provided to an ID-writing device during the legitimate client device's factory shipment stage, and the ID-writing device could write the legitimate client device ID information into a trusted environment of the client device.

In operation 340, the identification service device can verify the legitimacy of the received client device ID information. In other words, the identification service device determines whether the received client device ID information is ID information that is locally maintained at the identification service device. In response to a determination that the received client device ID information is ID information that is locally maintained, the identification service device determines that the client device ID information is legitimate, and the identification service device can proceed to determine the client device public key corresponding to the client device ID information. In response to a determination that the received client device ID information is ID information that is not locally maintained, the identification service device determines that the client device ID information is not legitimate, and the identification service device can send back to the server device a response indicating that the client device ID information is not legitimate. The server device determines a failure to establish communication and sends back to the client device a response indicating a failure to establish communication.

The client device public key and the client device private key are paired keys, which can be generated by the identification service device. The client device private key, moreover, is provided to a client device to be maintained. In other words, the client device private key is written into a trusted environment of the client device. The writing of the client device private key operation can be performed during the factory shipment stage of the client device or in another stage capable of ensuring information security of the client device private key. The identification service device can locally maintain correspondences between client device ID information and client public keys.

In the event that the identification service device determines the client device public key corresponding to the client device ID information, then control passes to operation 350. In the event that no client device public key corresponding to the client device ID information has been maintained locally, then a response can be sent back to the server device indicating that the client device public key does not exist. In response to a determination that the client device public key does not exist, the server device determines a failure to establish communication, and the server device can send back to the client device a response indicating a failure to establish communication.

In 350, the identification service device sends the client device public key back to the server device.

In 360, the server device generates a session key and encrypts the session key based on the client device public key to obtain an encrypted session key.

The session key can be a random key produced based on a certain algorithm (e.g., Monte Carlo algorithm), a hardware true random number generator, etc. The session key can be a symmetric key or an asymmetric key. Since the generation and use of session keys are understood in the art, they will not be further discussed for conciseness. In operation 360, the server device encrypts the session key based on the client device public key to ensure that the session key can be securely and confidentially transmitted to the client device.

In addition to generating the session key in real time, a session key pool can be pre-generated and maintained from which the server device can randomly assign a session key from the session key pool. Typically, a session key has a certain expiration date after which the session key expires. An expired session key can be reassigned to a new communication connection. In some embodiments, session keys are assigned based on one of the above assignment techniques.

In 370, the server device sends the encrypted session key to the client device.

Because a server device typically is a single-service type of server and does not have other applications, the server device itself has a certain security level. The server device itself can also be regarded as a trusted environment.

In 380, the client device acquires the client device private key in a trusted environment, and decrypts, based on the client device private key, the encrypted session key to obtain a decrypted session key.

Because the encrypted session key was encrypted using the client device public key, the session key can only be decrypted using the client device private key. In some embodiments, the client device private key is acquired only from the trusted environment. Limiting the acquisition of the client device private key from only the trusted environment ensures that only the client device can decrypt the session key. Moreover, because decryption of the session key can also be performed in the trusted environment, the session key is assured to not be acquired and altered by another device.

In 390, the client device conducts data communications with the server device using the decrypted session key.

All subsequent data communication between the client device and the server device uses the session key for encryption and decryption of the subsequent data communication. In the event that the session key is a symmetric key, the client device and the server device use the same key for data encryption and decryption. In the event that the session key is an asymmetric key, the client device and the server device use one of a pair of keys for data encryption and decryption.

When using the session key to conduct data communications with the server device, the client device encrypts and decrypts the data in the trusted environment.

Figure 4:
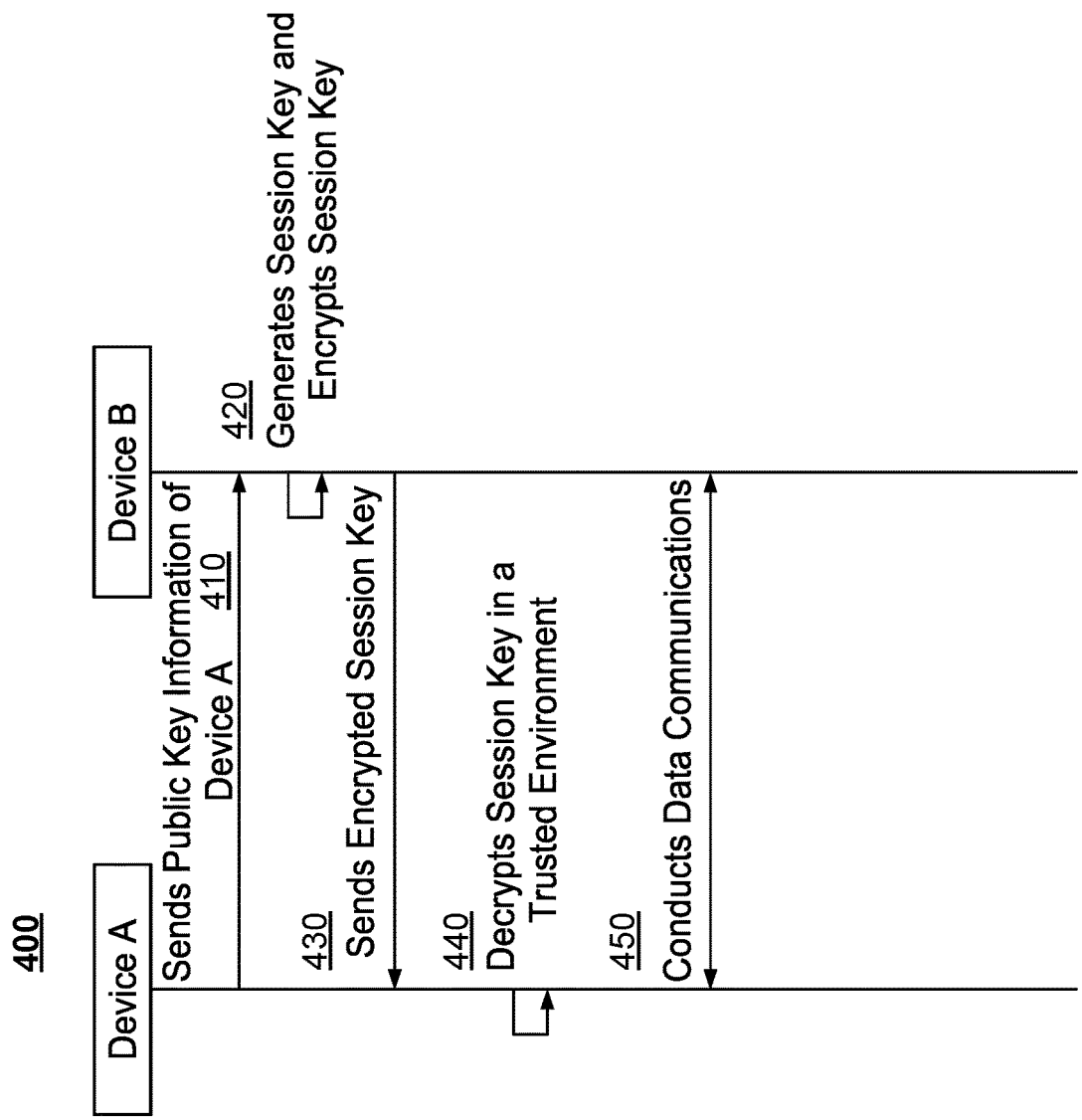
FIG. 4 is a flowchart of yet another embodiment of a process for establishing inter-device communication.

FIG. 4 is a flowchart of yet another embodiment of a process for establishing inter-device communication. In some embodiments, the process 400 is performed by a client device 110 or 120 of FIG. 1, which corresponds with device A or device B, and comprises:

In 410, the device A sends public key information of device A to device B.

Operation 410 can be triggered when device A is to establish a communication connection with device B. In other words, operation 410 can be triggered and executed by device A. Operation 410 can also be triggered by device B. For example, operation 410 is performed when device A receives a connection request from device B.

Similar to process 300 of FIG. 3, in process 400 of FIG. 4, the public key and the private key of device A can be pre-generated by an identification service device and provided to device A. In some embodiments, a private key of device A is pre-written into a trusted environment of device A.

In 420, device B generates a session key in a trusted environment and encrypts the session key based on the public key information of device A to obtain an encrypted session key.

In some embodiments, the session key is a random key generated based on a certain algorithm. In some embodiments, the session key is a symmetric key or an asymmetric key.

In 430, device B sends the encrypted session key to device A.

In 440, device A decrypts, based on the private key of device A, the encrypted session key in a trusted environment to obtain a decrypted session key.

Since the encrypted session key was encrypted using the device A public key, the encrypted session key can only be decrypted using the private key of device A. In some embodiments, the private key of device A can only be acquired from a trusted environment. Therefore, only device A can decrypt the encrypted session key, and since decryption of the encrypted session key is performed in a trusted environment, the session key is assured that it will not be acquired and altered by another device.

In 450, device A conducts data communications with device B using the decrypted session key.

All subsequent data communication between device A and device B uses the session key for encryption and decryption. In the event that the session key is a symmetric key, device A and device B use the same key for data encryption and decryption. In the event that the session key is an asymmetric key, device A and device B use one of a pair of keys for data encryption and decryption.

When conducting data communications with device B using the session key, device A encrypts and decrypts the data in a trusted environment.

Some embodiments of a client device in FIGS. 3 and 4 are described below.

Figure 5:
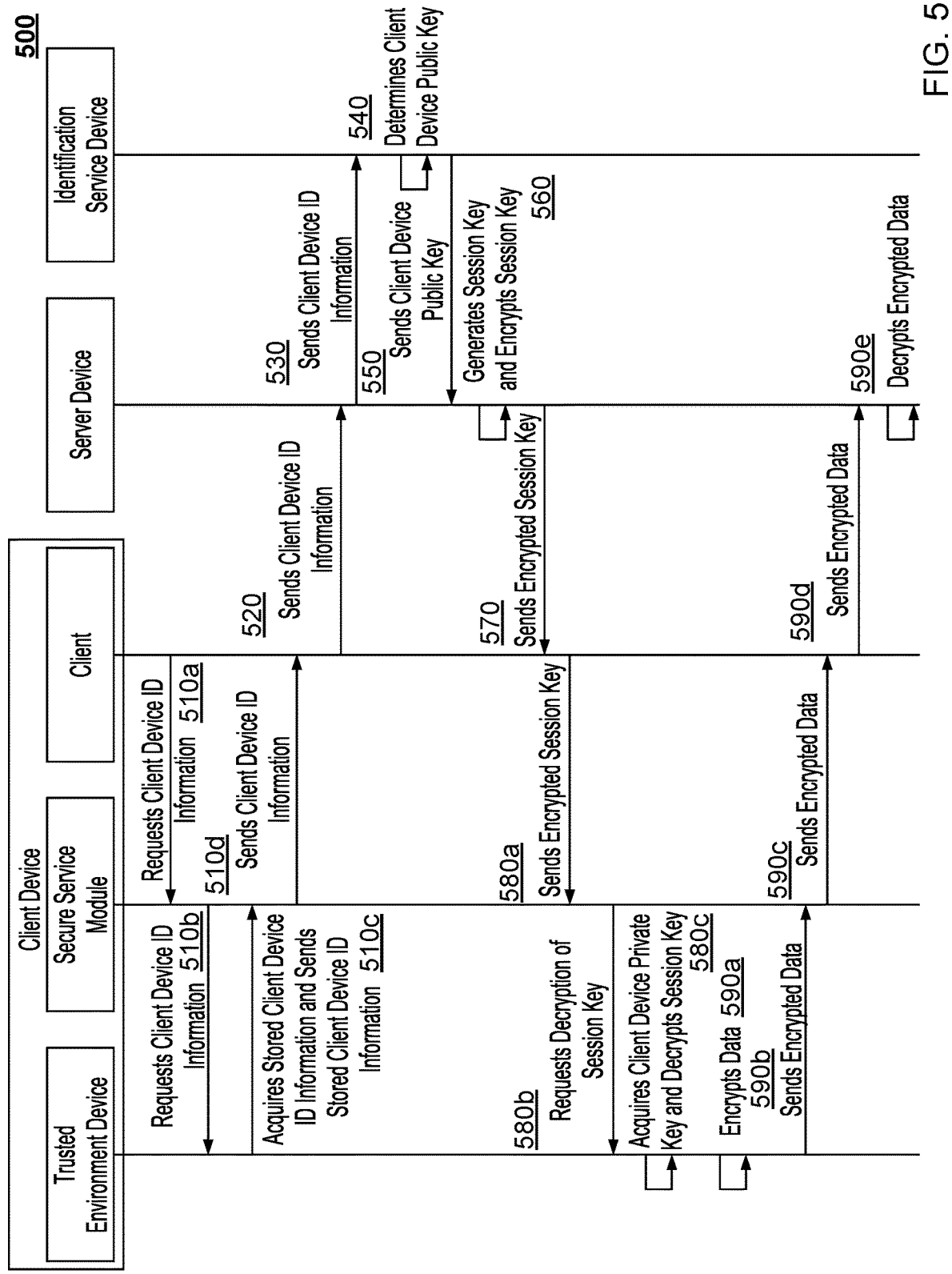
FIG. 5 is a flowchart of an example of a process for establishing inter-device communication.

FIG. 5 is a flowchart of an example of a process for establishing inter-device communication. In some embodiments, the process 500 is performed by a client device of FIG. 3 or FIG. 4. In some embodiments, the client device includes a client (e.g., Application), a secure service module (e.g., Operating System), and a trusted environment module (e.g., SE or TEE), and the process 500 includes the following:

In 510a, the client requests client device ID information from the secure service module.

In 510b, after the secure service module analyzes the request, the secure service module requests the client device ID information from the trusted environment module. For example, the request analysis includes parsing the request.

In 510c, the trusted environment module acquires stored client device ID information and sends the stored client device ID information back to the secure service module.

The client device ID information is pre-stored in a secure environment on the client device. The trusted environment module is responsible for its maintenance and processing.

In 510d, the secure service module sends the client device ID information back to the client.

Operations 510a through 510d correspond to operation 310 of FIG. 3.

In 520, the client device sends the client device ID information to a server device.

Operations 530 to 570 correspond to operations 330 to 370 of FIG. 3, and will not be repeated for conciseness.

In 580a, the client sends the encrypted session key to the secure service module.

In 580b, the secure service module requests that the trusted environment module decrypt the encrypted session key.

In 580c, the trusted environment module acquires a client device private key and decrypts the session key based on the client device private key to obtain a decrypted session key.

Operations 580a through 580c correspond to operation 380 of FIG. 3.

In 590a, the trusted environment module encrypts the data based on the decrypted session key.

In 590b, the trusted environment module sends the encrypted data to the secure service module.

In 590c, the secure service module sends the encrypted data to the client.

In 590d, the client sends the encrypted data to the server device.

In 590e, the server device decrypts the encrypted data based on the session key.

After the server device sends the data encrypted using the session key to the client, the client sends the encrypted data through the secure service module to the trusted environment module, and the trusted environment module decrypts the encrypted data using the decrypted session key. These operations are not shown in FIG. 5. Operations 590a through 590e correspond to operation 390 in FIG. 3.

Figure 6:
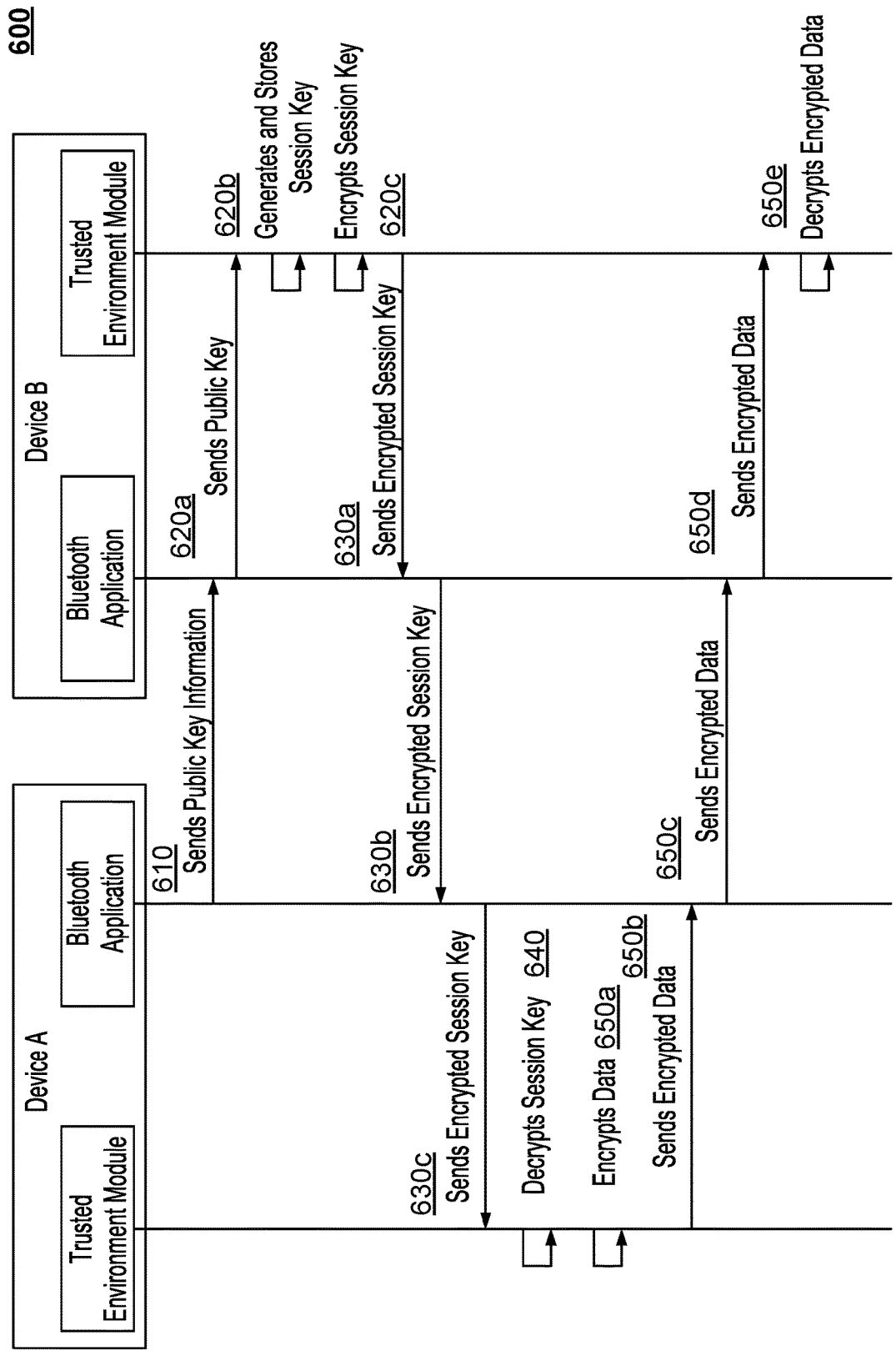
FIG. 6 is a flowchart of another example of a process for establishing inter-device communication.

FIG. 6 is a flowchart of another example of a process for establishing inter-device communication. In some embodiments, the process 600 is performed by a client device 100 of FIG. 1. The client device includes a Bluetooth application and a trusted environment module. In some embodiments, the process 600 includes the following:

In 610, a Bluetooth application of device A sends public key information of device A to a Bluetooth application of device B.

In 620a, the Bluetooth application of device B sends a public key of device A to a trusted environment module of device B.

In 620b, the trusted environment module of device B generates and stores a session key.

In 620c, the trusted environment module of device B encrypts the session key using the public key of device A to obtain an encrypted session key.

Operations 620a through 620c correspond to operation 420 of FIG. 4.

In 630a, the trusted environment module of device B sends the encrypted session key to the Bluetooth application of device B.

In 630b, the Bluetooth application of device B sends the encrypted session key to the Bluetooth application of device A.

In 630c, the Bluetooth application of device A sends the encrypted session key to the trusted environment module of device A.

Operations 630a through 630c correspond to operation 430 of FIG. 4.

In 640, the trusted environment module of device A decrypts the encrypted session key with the private key of device A to obtain a decrypted session key.

In 650a, the trusted environment module of device A encrypts the data based on the decrypted session key to obtain encrypted data.

In 650b, the trusted environment module of device A sends the encrypted data to the Bluetooth application of device A.

In 650c, the Bluetooth application of device A sends the encrypted data to the Bluetooth application of device B.

In 650d, the Bluetooth application of device B sends the encrypted data to the trusted environment module of device B.

In 650e, the trusted environment module of device B decrypts the encrypted data based on the session key.

Subsequently, the trusted environment module of device B encrypts, based on the decrypted session key, the data that is to be sent to device A. Device B sends encrypted data via the Bluetooth application to the Bluetooth application of device A. The Bluetooth application of device A sends the encrypted data to the trusted environment module of device A. The trusted environment module of device A decrypts the data based on the decrypted session key. These operations are not shown in FIG. 6. Operations 650a through 650e correspond to operation 450 of FIG. 4.

Figure 7:
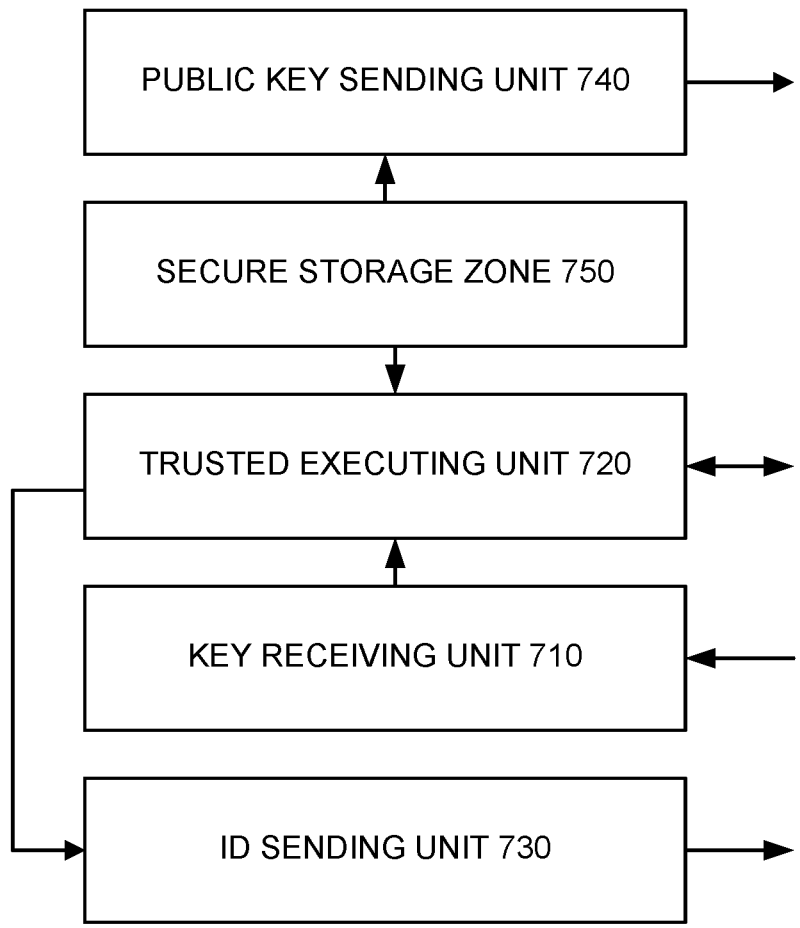
FIG. 7 is a structural diagram of an embodiment of a device for establishing inter-device communication.

FIG. 7 is a structural diagram of an embodiment of a device for establishing inter-device communication. In some embodiments, the device 700 implements the process 300 of FIG. 3 or the process 400 of FIG. 4 and comprises: a key receiving unit 710 and a trusted executing unit 720. The device 700 optionally further comprises: an ID sending unit 730 and a secure storage zone 750.

In some embodiments, the key receiving unit 710 is configured to receive an encrypted session key sent by a second device. In some embodiments, the key receiving unit 710 performs two approaches below:

In a first approach, the ID sending unit 730 sends first device's identifying information to a second device so that the second device can determine a first device's public key corresponding to the first device's identifying information and send, to the first device, a session key encrypted based on the first device's public key.

The ID sending unit 730 requests and acquires the first device's identifying information from the trusted executing unit 720. In response to the request of the ID sending unit 730, the trusted executing unit 720 acquires the first device's identifying information from the secure storage zone 750 and sends the first device's identifying information back to the ID sending unit 730.

The first device's identifying information can be assigned and maintained in advance by an identification service device. For example, the first device's identifying information is provided to an ID-writing device during the client device's factory shipment stage, and the ID-writing device writes the client device ID into the client device. To keep the client device ID information secure, the client device ID information can be stored in a secure environment, such as a secure storage zone, to ensure that the ID information is not altered.

The identification service device can pre-generate and maintain a first device's public key corresponding to the first device's identifying information and make the first device's public key available to the second device. Also, the first device's private key can be pre-written into a secure storage zone of the first device.

The pre-writing of the first device's private key into the secure storage zone can be applied to a scenario where the first device is a client device and the second device is a server device.

In a second approach, the device 700 further comprises a public key sending unit 740 which sends a first device's public key to the second device so that the second device can send back, to the first device, an encrypted session key after using the first device's public key to encrypt the session key.

Likewise, the first device's public key and first device's private key can be generated by an identification service device and provided to the first device. Moreover, the first device's private key can be pre-written into a secure storage zone of the first device.

The pre-writing of the first device's private key into the secure storage zone can be applied to a scenario where both the first device and the second device are client devices.

In some embodiments, the trusted executing unit 720 is configured to decrypt, based on the first device's private key, the encrypted session key in a trusted environment to obtain a decrypted session key, and conduct data communication between the first device and the second device using the decrypted session key.

In some embodiments, the trusted environment can be a secure zone that has been isolated on hardware using a mechanism such as ARM TrustZone, Secure Element, or TI M-Shield. In some embodiments, the trusted environment can be a secure module isolated using a virtualization mechanism.

Figure 8:
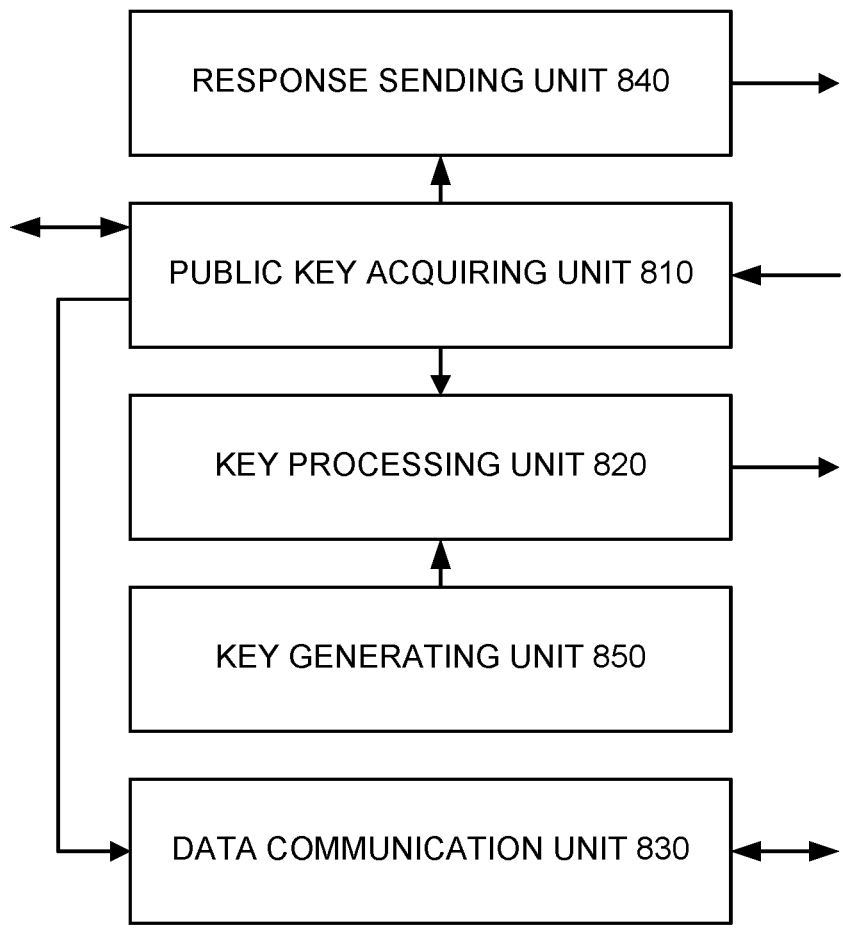
FIG. 8 is a structural diagram of another embodiment of a device for establishing inter-device communication.

FIG. 8 is a structural diagram of another embodiment of a device for establishing inter-device communication. In some embodiments, the device 800 implements the process 300 of FIG. 3 or the process 400 of FIG. 4 and comprises: a public key acquiring unit 810, a key processing unit 820, and a data communication unit 830. The device 800 can further comprise: a response sending unit 840 and a key generating unit 850.

In some embodiments, the public key acquiring unit 810 is configured to acquire a first device's public key. The public key acquiring unit 810 can perform the two approaches below:

In a first approach, the public key acquiring unit 810 receives first device's identifying information and acquires a first device's public key corresponding to the first device's identifying information from an identification service device.

The response sending unit 840 can send back to the first device a response indicating failure to establish communication in response to a determination that the public key acquiring unit 810 receives a response from the identification service device indicating that the first device's identifying information is not legitimate or a first device's public key corresponding to the first device's identifying information does not exist.

The acquiring of the first device's public key can be applicable to a scenario where the first device is a client device and the second device is a server device.

In a second approach, the public key acquiring unit 810 receives the first device's public key sent by the first device.

The acquiring of the first device's public key can be applicable to a scenario where both the first device and the second device are client devices.

The key processing unit 820 is configured to encrypt the session key with the first device's public key to obtain an encrypted session key and send the encrypted session key to the first device.

The data communication unit 830 is configured to conduct data communications between the second device and the first device based on the encrypted session key.

In some embodiments, the key generating unit 850 is configured to generate the session key. In some embodiments, the session key can be a random key generated based on a certain algorithm. In some embodiments, the session key can be a symmetric key or an asymmetric key.

In some embodiments, to ensure the security of the session key, the key generating unit 850 and the key processing unit 820 are set up in a trusted environment.

Figure 9:
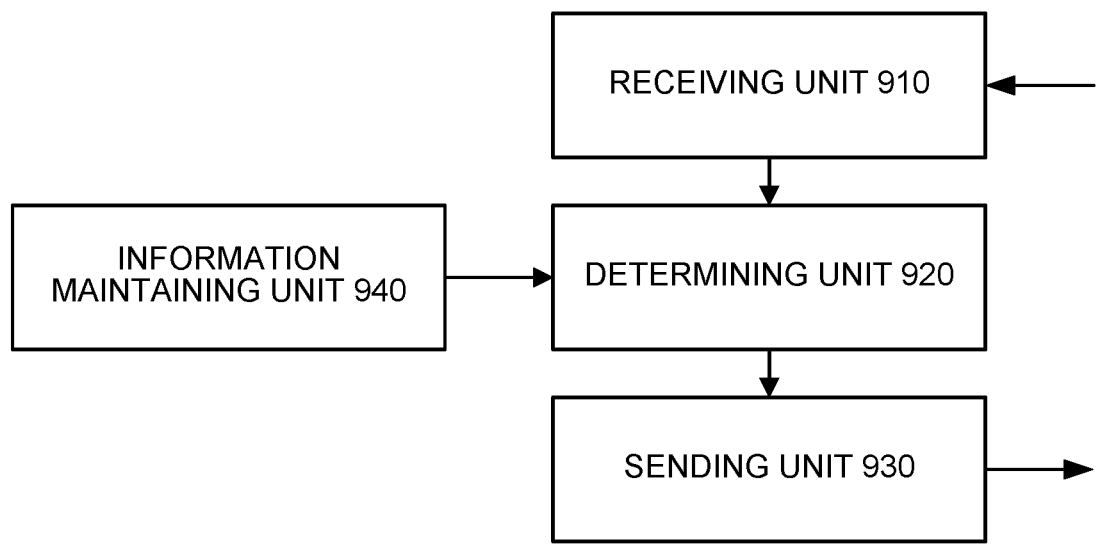
FIG. 9 is a structural diagram of yet another embodiment of a device for establishing inter-device communication.

FIG. 9 is a structural diagram of yet another embodiment of a device for establishing inter-device communication. In some embodiments, the device 900 is set up on an identification service device and implements the process 500 of FIG. 5. In some embodiments, the device 900 comprises: a receiving unit 910, a determining unit 920, and a sending unit 930. The device 900 can further comprise: an information maintaining unit 940.

In some embodiments, the receiving unit 910 is configured to receive the first device's identifying information sent by a second device.

In some embodiments, the determining unit 920 is configured to determine a first device's public key corresponding to the first device's identifying information.

In some embodiments, the sending unit 930 is configured to send back the first device's public key to the second device so that the second device can encrypt the session key using the first device's public key to obtain an encrypted session key, and send to the first device the encrypted session key. The encrypted session key is to be used for data communication between the first device and the second device.

In some embodiments, the information maintaining unit 940 is configured to maintain identifying information pre-assigned to the first device and maintain a first device's public key and the first device's private key pre-generated for the first device. The first device's identifying information can be assigned by the identification service device, provided to an ID-writing device, and written into the first device during the first device's factory shipment stage. The first device's public key and the first device's private key can be generated by the identification service device, provided to an ID-writing device during the first device's factory shipment stage, and written into a secure zone of the first device.

As an aspect, in response to a determination that the determining unit 920 determines that the first device's identifying information is not legitimate, the sending unit 930 can send back to the second device a response indicating that the first device's identifying information is not legitimate. As another aspect, the sending unit 930 can send back to the second device a response indicating that the first device's identifying information does not exist in response to a determination that the determining unit 920 determines that the first device's public key corresponding to the first device's identifying information does not exist.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software units, or combinations of both. Software units can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 10:
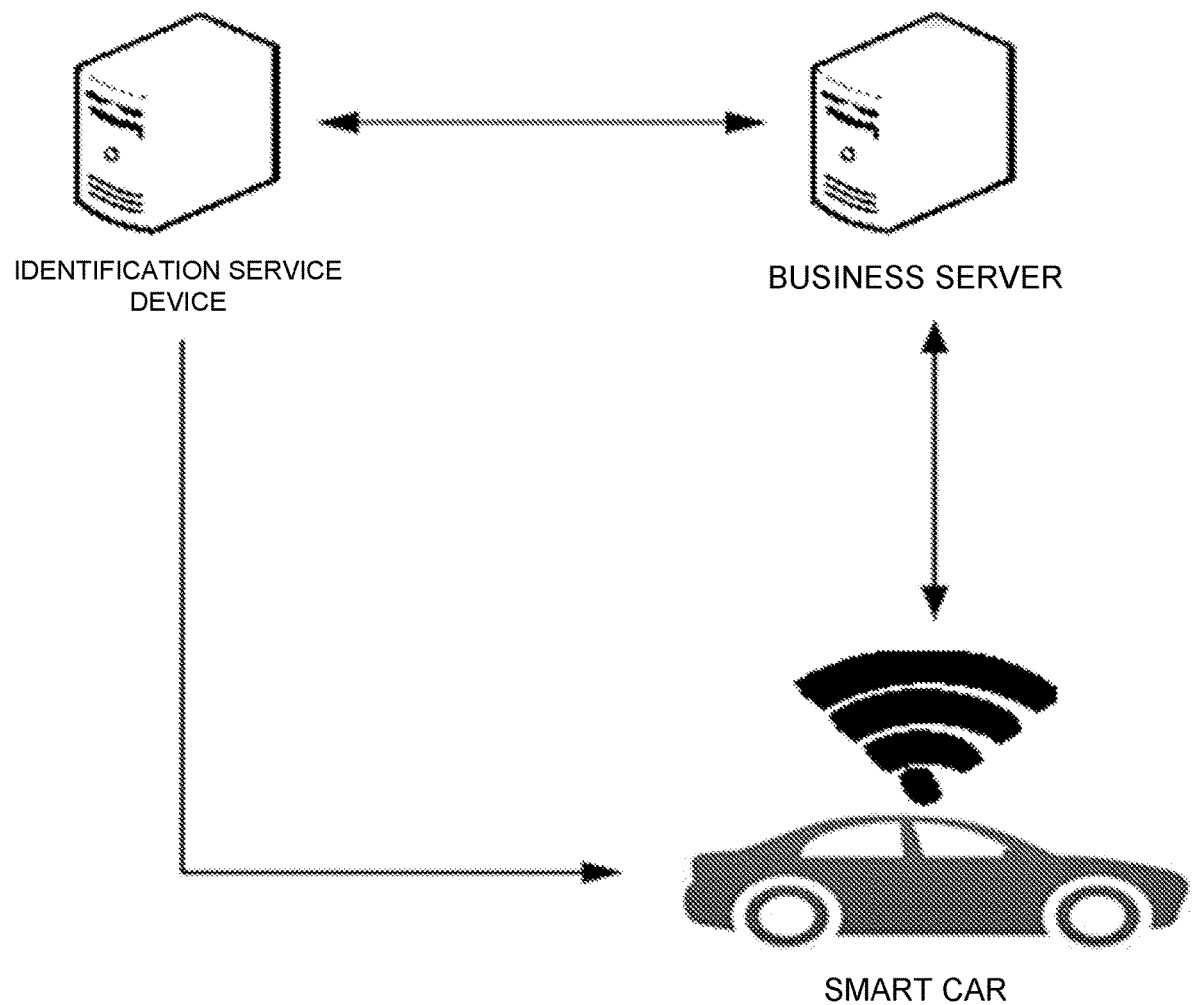
FIG. 10 is a diagram of an application scenario of a process for establishing inter-device communication.

Various application scenarios are presented below:

FIG. 10 is a diagram of an application scenario of a process for establishing inter-device communication.

In a first application scenario, as shown in FIG. 10, an identification service device pre-generates smart car ID information for a smart car and pre-generates a public key-private key pair for the smart car. The public key-private key pair includes a public key and a corresponding private key. The identification service device sends the smart car ID information and the private key of the public key-private key pair to an ID-writing device so that the ID-writing device can write the smart car ID information and the private key of the public key-private key pair into a trusted chip installed on the smart car when the smart car is to be shipped from the factory. The trusted chip can be a secure encryption/decryption chip, such as SE, TEE or a secure microcontroller (MCU).

In response to a determination that the smart car is to establish a connection with a business server via a network such as the Internet of Things (IoT) and thus utilize the services of the business server (e.g., acquire from the business server navigation information, road condition information, control information, etc.), the smart car sends the smart car ID information to the business server. The business server sends the smart car ID information to the identification service device. The identification service device sends a public key corresponding to the smart car ID information to the business server. The business server encrypts the random session key based on the smart car public key to obtain an encrypted session key and sends the encrypted session key to the smart car. After receiving the session key, the smart car provides the session key to the trusted chip. After acquiring the smart car private key, the trusted chip decrypts the encrypted session key based on the private key to obtain a decrypted session key. The trusted chip thereafter conducts, based on the decrypted session key, data communications with the business server. The security of data communications between the smart car and the business server is thus ensured.

Figure 11:
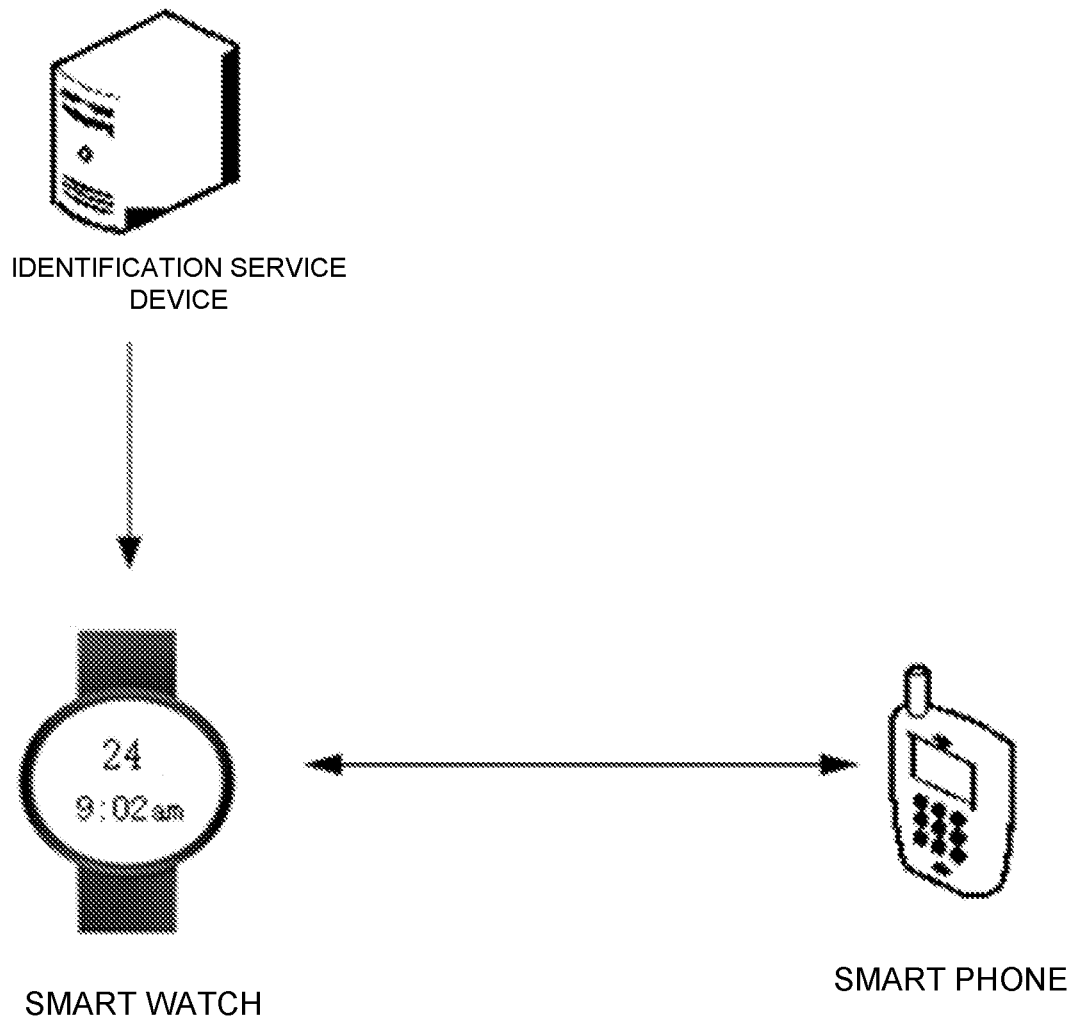
FIG. 11 is a diagram of another application scenario of a process for establishing inter-device communication.

FIG. 11 is a diagram of another application scenario of a process for establishing inter-device communication.

In a second application scenario, as shown in FIG. 11, an identification service device pre-generates smart watch ID information for a smart watch and pre-generates a public key-private key pair for the smart watch. The smart watch sends the smart watch ID information and a private key of the public key-private key pair to an ID-writing device so that the ID-writing device can write the smart watch ID information and the private key into a trusted chip of the smart watch when the smart watch is to be shipped from the factory.

In response to a determination that the smart watch establishes a connection with a mobile phone and thereupon exchanges data, the smart watch sends the smart watch public key to the mobile phone. A trusted chip in the mobile phone encrypts, based on the smart watch public key, a generated session key to obtain an encrypted session key and then sends the encrypted session key to the smart watch.

After the smart watch receives the encrypted session key, the trusted chip acquires the smart watch private key and decrypts, based on the smart watch private key, the encrypted session key to obtain a decrypted session key. The decrypted session key is thereafter used for data communications with the mobile phone, and thus security of the data communications between the smart watch and the mobile phone is ensured.

The present application can be applied to other application scenarios in addition to the above application scenarios. Examples of other application scenarios include secure communications between a smart television and a smart server and communications between a smart phone and a smart home device. The same communication technique described above can be applied to these application scenarios. These examples of other application scenarios will not be further described for conciseness.

Figure 12:
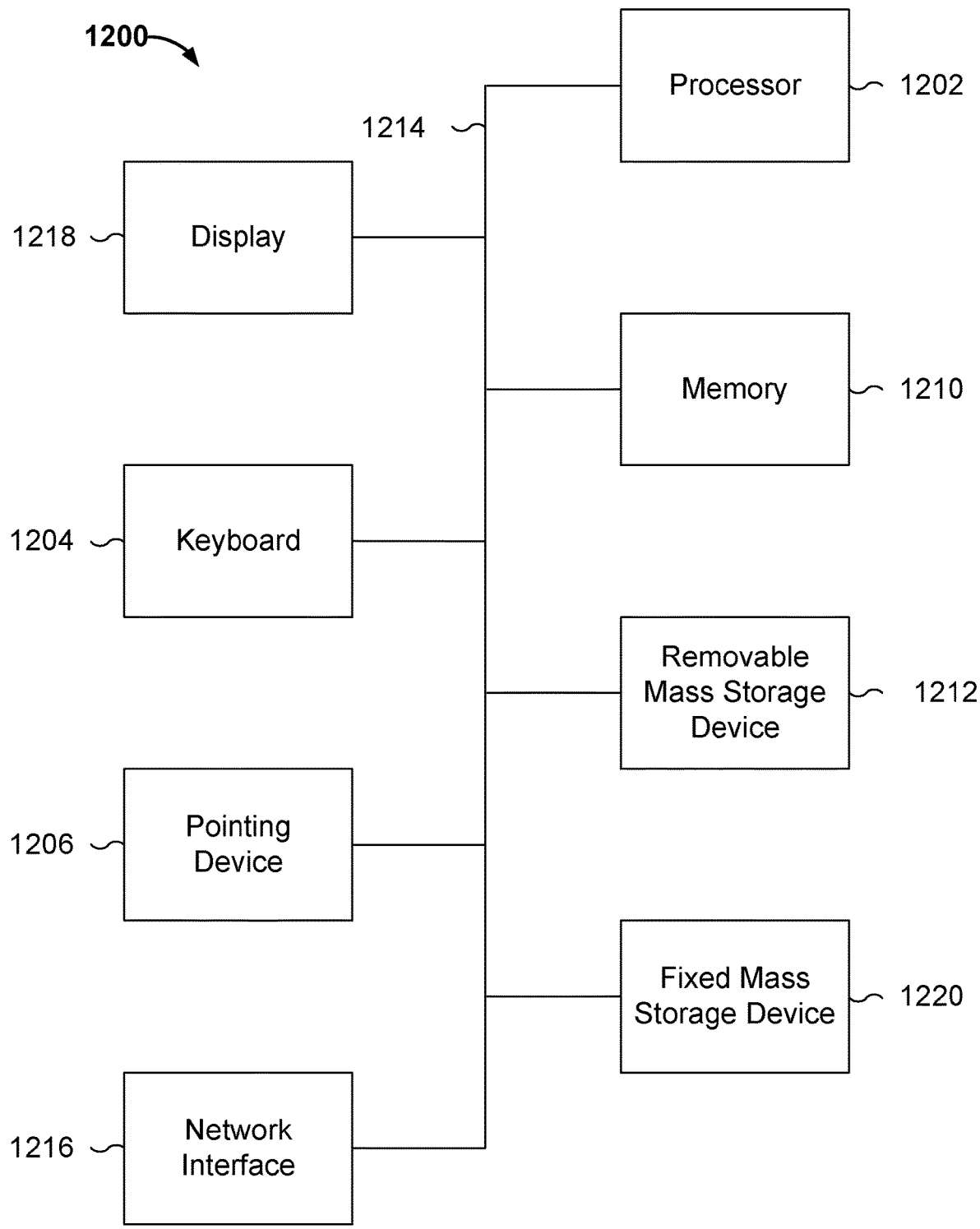
FIG. 12 is a functional diagram illustrating a programmed computer system for establishing inter-device communication in accordance with some embodiments.

FIG. 12 is a functional diagram illustrating a programmed computer system for establishing inter-device communication in accordance with some embodiments. As will be apparent, other computer system architectures and configurations can be used to establish inter-device communication. Computer system 1200, which includes various subsystems as described below, includes at least one microprocessor subsystem (also referred to as a processor or a central processing unit (CPU)) 1202. For example, processor 1202 can be implemented by a single-chip processor or by multiple processors. In some embodiments, processor 1202 is a general purpose digital processor that controls the operation of the computer system 1200. Using instructions retrieved from memory 1210, the processor 1202 controls the reception and manipulation of input data, and the output and display of data on output devices (e.g., display 1218).

Processor 1202 is coupled bi-directionally with memory 1210, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1202. Also as is well known in the art, primary storage typically includes basic operating instructions, program code, data, and objects used by the processor 1202 to perform its functions (e.g., programmed instructions). For example, memory 1210 can include any suitable computer-readable storage media, described below, depending on whether, for example, data access needs to be bi-directional or uni-directional. For example, processor 1202 can also directly and very rapidly retrieve and store frequently needed data in a cache memory (not shown).

A removable mass storage device 1212 provides additional data storage capacity for the computer system 1200, and is coupled either bi-directionally (read/write) or unidirectionally (read only) to processor 1202. For example, storage 1212 can also include computer-readable media such as magnetic tape, flash memory, PC-CARDS, portable mass storage devices, holographic storage devices, and other storage devices. A fixed mass storage 1220 can also, for example, provide additional data storage capacity. The most common example of mass storage 1220 is a hard disk drive. Mass storages 1212, 1220 generally store additional programming instructions, data, and the like that typically are not in active use by the processor 1202. It will be appreciated that the information retained within mass storages 1212 and 1220 can be incorporated, if needed, in standard fashion as part of memory 1210 (e.g., RAM) as virtual memory.

In addition to providing processor 1202 access to storage subsystems, bus 1214 can also be used to provide access to other subsystems and devices. As shown, these can include a display monitor 1218, a network interface 1216, a keyboard 1204, and a pointing device 1206, as well as an auxiliary input/output device interface, a sound card, speakers, and other subsystems as needed. For example, the pointing device 1206 can be a mouse, stylus, track ball, or tablet, and is useful for interacting with a graphical user interface.

The network interface 1216 allows processor 1202 to be coupled to another computer, computer network, or telecommunications network using a network connection as shown. For example, through the network interface 1216, the processor 1202 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1202 can be used to connect the computer system 1200 to an external network and transfer data according to standard protocols. For example, various process embodiments disclosed herein can be executed on processor 1202, or can be performed across a network such as the Internet, intranet networks, or local area networks, in conjunction with a remote processor that shares a portion of the processing. Additional mass storage devices (not shown) can also be connected to processor 1202 through network interface 1216.

An auxiliary I/O device interface (not shown) can be used in conjunction with computer system 1200. The auxiliary I/O device interface can include general and customized interfaces that allow the processor 1202 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 12 is but an example of a computer system suitable for use with the various embodiments disclosed herein. Other computer systems suitable for such use can include additional or fewer subsystems. In addition, bus 1214 is illustrative of any interconnection scheme serving to link the subsystems. Other computer architectures having different configurations of subsystems can also be utilized.

From the above descriptions, the processes, devices, and the system provided by the present invention provide at least the following benefits:

1) In the present application, the client device private key is stored in a trusted environment and the decryption of the session key is performed in the trusted environment to prevent interception of the private key or the session key resulting from OS loopholes and increase inter-device communication security.

2) The present application is applicable to multiple application scenarios, such as communication between client devices or communication between a client device and a server device, and thus the present application flexibly satisfies multiple application needs.

3) When conducting secure communications between a client device and a server device, control over the legitimacy of device IDs and the legitimacy of correspondences between device IDs and device public keys through an identification service device are maintained. The present application thus further increases the security of communications between client devices and server devices.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
  receiving, using a first device, an encrypted session key sent by a second device, wherein the first device includes a client, a secure service module, and a trusted environment, wherein the client corresponds to an application, and wherein the secure service module corresponds to an operating system;
  decrypting, based on a private key of the first device, the encrypted session key in the trusted environment to obtain a decrypted session key, comprising:
    sending the encrypted session key to the trusted environment, wherein the trusted environment includes a trusted chip, or a secure environment isolated using a virtualization mechanism, wherein the sending of the encrypted session key to the trusted environment comprises:
      sending, using the client, the encrypted session key to the secure service module; and
      requesting, using the secure service module, that the trusted environment decrypt the encrypted session key; and
    decrypting, in the trusted environment, the encrypted session key to obtain the decrypted session key, comprising:
      acquiring, in the trusted environment, the private key; and
      decrypting, in the trusted environment, the encrypted session key using the private key to obtain the decrypted session key; and
  conducting, based on the decrypted session key, data communication with the second device.

2. The method as described in claim 1, further comprising:
  before the receiving of the encrypted session key:
    sending, using the first device, identifying information of the first device to the second device to cause the second device to:

send the identifying information of the first device to an identification service device to retrieve a public key of the first device corresponding to the identifying information of the first device; and send the encrypted session key to the first device, the encrypted session key being obtained based at least in part on encrypting a session key based on the public key of the first device.

3. The method as described in claim 2, wherein the identifying information of the first device is stored in the trusted environment;

the identifying information of the first device is assigned in advance by the identification service device;

the public key of the first device corresponding to the identifying information of the first device is pre-generated by the identification service device; and the private key of the first device is pre-written into the trusted environment of the first device.

4. The method as described in claim 2, wherein:

the first device corresponds to a client device;

the second device corresponds to a first server device; and the identification service device corresponds to a second server device.

5. The method as described in claim 1, further comprising:

before the receiving of the encrypted session key:

sending a public key of the first device to the second device, the second device being configured to:

encrypt a session key based on the public key of the first device to obtain the encrypted session key; and send the encrypted session key to the second device, wherein:

the public key of the first device and the private key of the first device are generated by an identification service device and provided to the first device; and the private key of the first device is pre-written into the trusted environment of the first device.

6. The method as described in claim 5, wherein the first device corresponds to a first client device and the second device corresponds to a second client device.

7. A method, comprising:

acquiring, using a second device, a public key of a first device, wherein the first device includes a client, a secure service module, and a trusted environment, wherein the client corresponds to an application, and wherein the secure service module corresponds to an operating system;

encrypting, using the second device, a session key using the public key of the first device to obtain an encrypted session key;

sending, using the second device, the encrypted session key to the first device to cause the first device to:

receive the encrypted session key sent by the second device;

decrypt, based on a private key of the first device, the encrypted session key in the trusted environment of the first device to obtain a decrypted session key, comprising to:

send the encrypted session key to the trusted environment, wherein the trusted environment includes a trusted chip, or a secure environment isolated using a virtualization mechanism, wherein the sending of the encrypted session key to the trusted environment comprises to:

send, using the client, the encrypted session key to the secure service module; and request, using the secure service module, that the trusted environment decrypt the encrypted session key; and decrypt, in the trusted environment, the encrypted session key to obtain a decrypted session key comprising to:

acquire, in the trusted environment, the private key; and decrypt, in the trusted environment, the encrypted session key using the private key to obtain the decrypted session key; and conducting, using the encrypted session key, data communications with the first device.

8. The method as described in claim 7, wherein the acquiring of the public key of the first device comprises:

receiving, using the second device, identifying information of the first device; and acquiring the public key of the first device corresponding to the identifying information of the first device from an identification service device.

9. The method as described in claim 8, further comprising:

in response to a determination that the second device receives a response from the identification service device indicating that the identifying information of the first device is not legitimate or a response indicating that the public key of the first device corresponding to the identifying information of the first device does not exist, sending back to the first device a response indicating a failure to establish communication.

10. The method as described in claim 8, wherein:

the first device corresponds to a client device;

the second device corresponds to a first server device; and the identification service device corresponds to a second server device.

11. The method as described in claim 7, wherein the acquiring of the public key of the first device comprises:

receiving, using the second device, the public key of the first device sent by the first device.

12. The method as described in claim 7, further comprising:

before the sending of the encrypted session key to the first device:

assigning, using the second device, a random session key, wherein the assigning of the random session key and the encrypting of the session key are performed by the second device within the trusted environment.

13. A method, comprising:

receiving, using an identification service device, identifying information of a first device sent by a second device, wherein the first device includes a client, a secure service module, and a trusted environment, wherein the client corresponds to an application, and wherein the secure service module corresponds to an operating system; and sending back, using the identification service device, a public key of the first device to the second device, the second device being configured to:

encrypt a session key with the public key of the first device to obtain an encrypted session key; and send the encrypted session key to the first device to cause the first device to:

decrypt, based on a private key of the first device, the encrypted session key in the trusted environment of the first device to obtain a decrypted session key, comprising to:

send the encrypted session key to the trusted environment, wherein the trusted environment includes a trusted chip, or a secure environment isolated using a virtualization mechanism, wherein the sending of the encrypted session key to the trusted environment comprises to:
send, using the client, the encrypted session key to the secure service module; and
request, using the secure service module, that the trusted environment decrypt the encrypted session key; and
decrypt, in the trusted environment, the encrypted session key to obtain a decrypted session key, the decrypted session key being used for data communication between the first device and the second device, wherein the decrypting of the encrypted session key comprises to:
acquire, in the trusted environment, the private key; and
decrypt in the trusted environment the encrypted session key using the private key to obtain the decrypted session key.

14. The method as described in claim 13, further comprising:
maintaining, using the identification service device, the identifying information of the first device; and
maintaining, using the identification service device, the public key of the first device and a private key of the first device for the first device.

15. The method as described in claim 14, further comprising:
pre-writing the private key of the first device into the trusted environment of the first device.

16. The method as described in claim 13, further comprising:
in response to a determination that the identification service device determines that the identifying information of the first device is not legitimate or the public key of the first device corresponding to the identifying information of the first device does not exist, sending back, using the identification service device, to the second device a response indicating that the identifying information of the first device is not legitimate.

17. The method as described in claim 13, further comprising:
determining, using the identification service device, whether the identifying information of the first device is legitimate and the public key of the first device exists; and
in response to a determination that the identifying information of the first device is legitimate and the public key of the first device exists, locating, using the identification service device, the public key of the first device based on the identifying information of the first device.

18. A first device, comprising:
a client, wherein the client corresponds to an application;
a secure service module, wherein the secure service module corresponds to an operating system;
a trusted environment;
a processor; and
a memory coupled with the processor, wherein the memory is configured to provide the processor with instructions which when executed cause the processor to:
receive an encrypted session key sent by a second device;
decrypt, based on a private key of the first device, the encrypted session key in the trusted environment to obtain a decrypted session key, comprising to:
send the encrypted session key to the trusted environment, wherein the trusted environment includes a trusted chip, or a secure environment isolated using a virtualization mechanism, wherein the sending of the encrypted session key to the trusted environment comprises to:
send, using the client, the encrypted session key to the secure service module; and
request, using the secure service module, that the trusted environment decrypt the encrypted session key; and
decrypt, in the trusted environment, the encrypted session key to obtain the decrypted session key, comprising to:
acquire, in the trusted environment, the private key; and
decrypt, in the trusted environment, the encrypted session key using the private key to obtain the decrypted session key; and
conduct, based on the decrypted session key, data communication with the second device.

19. The first device as described in claim 18, wherein the processor is further configured to:
before the receiving of the encrypted session key:
send, using the first device, identifying information of the first device to the second device to cause the second device to:
send the identifying information of the first device to an identification service device to retrieve a public key of the first device corresponding to the identifying information of the first device; and
send the encrypted session key to the first device, the encrypted session key being obtained based at least in part on encrypting a session key based on the public key of the first device.

20. The first device as described in claim 19, wherein the sending of the identifying information of the first device comprises to:
acquire the identifying information of the first device from a secure storage zone; and
send the identifying information of the first device to the second device, wherein:
the identifying information of the first device is assigned in advance by an identification service device;
the public key of the first device corresponding to the identifying information of the first device is pre-generated by the identification service device; and
the private key of the first device is pre-written into the secure storage zone of the first device.

21. The first device as described in claim 19, wherein:
the first device corresponds to a client device;
the second device corresponds to a first server device; and
the identification service device corresponds to a second server device.

22. The first device as described in claim 18, wherein the processor is further configured to:
before the receiving of the encrypted session key:
send a public key of the first device to the second device, the second device being configured to:
encrypt a session key based on the public key of the first device to obtain the encrypted session key; and send the encrypted session key to the second device, wherein:
the public key of the first device and the private key of the first device are generated by an identification service device and provided to the first device; and
the private key of the first device is pre-written into the trusted environment of the first device.

23. The first device as described in claim 22, wherein the first device corresponds to a first client device and the second device corresponds to a second client device.

24. A second device, comprising:
a processor; and
a memory coupled with the processor, wherein the memory is configured to provide the processor with instructions which when executed cause the processor to:
acquire a public key of a first device, wherein the first device includes a client, a secure service module, and a trusted environment, wherein the client corresponds to an application and wherein the secure service module corresponds to an operating system;
encrypt a session key using the public key of the first device to obtain an encrypted session key;
send the encrypted session key to the first device to cause the first device to:
receive the encrypted session key sent by the second device;
decrypt, based on a private key of the first device, the encrypted session key in the trusted environment of the first device to obtain a decrypted session key, comprising to:
send the encrypted session key to the trusted environment, wherein the trusted environment includes a trusted chip, or a secure environment isolated using a virtualization mechanism, wherein the sending of the encrypted session key to the trusted environment comprises to:
send, using the client, the encrypted session key to the secure service module; and
request, using the secure service module, that the trusted environment decrypt the encrypted session key; and
decrypt, in the trusted environment, the encrypted session key to obtain a decrypted session key, comprising to:
acquire, in the trusted environment, the private key; and
decrypt, in the trusted environment, the encrypted session key using the private key to obtain the decrypted session key; and
conduct, using the encrypted session key, data communications with the first device.

25. The second device as described in claim 24, wherein the acquiring of the public key of the first device comprises to:
receive identifying information of the first device; and
acquire the public key of the first device corresponding to the identifying information of the first device from an identification service device.

26. The second device as described in claim 25, wherein the processor is further configured to:
in response to a determination that the second device receives a response from the identification service device indicating that the identifying information of the first device is not legitimate or a response indicating that the public key of the first device corresponding to the identifying information of the first device does not exist, send back to the first device a response indicating a failure to establish communication.

27. The second device as described in claim 25, wherein:
the first device corresponds to a client device;
the second device corresponds to a first server device; and
the identification service device corresponds to a second server device.

28. The second device as described in claim 24, wherein:
the acquiring of the public key of the first device comprises to:
receive the public key of the first device sent by the first device.

29. The second device as described in claim 24, wherein the processor is further configured to:
before the sending of the encrypted session key to the first device:
assign a random session key, wherein the assigning of the random session key and the encrypting of the session key are performed within the trusted environment.

30. An identification service device, comprising:
a processor; and
a memory coupled with the processor, wherein the memory is configured to provide the processor with instructions which when executed cause the processor to:
receive identifying information of a first device sent by a second device, wherein the first device includes a client, a secure service module, and a trusted environment, wherein the client corresponds to an application, and wherein the secure service module corresponds to an operating system; and
send back a public key of the first device corresponding to the identifying information of the first device to the second device, the second device being configured to:
encrypt a session key with the public key of the first device to obtain an encrypted session key; and
send the encrypted session key to the first device to cause the first device to:
decrypt, based on a private key of the first device, the encrypted session key in the trusted environment of the first device to obtain a decrypted session key, comprising to:
send the encrypted session key to the trusted environment, wherein the trusted environment includes a trusted chip, or a secure environment isolated using a virtualization mechanism, wherein the sending of the encrypted session key to the trusted environment comprises to:
send, using the client, the encrypted session key to the secure service module; and
request, using the secure service module, that the trusted environment decrypt the encrypted session key; and
decrypt, in the trusted environment, the encrypted session key to obtain a decrypted session key, the decrypted session key being used for data communication between the first device and the second device, wherein the decrypting of the encrypted session key comprises to:
acquire, in the trusted environment, the private key; and decrypt in the trusted environment the encrypted session key using the private key to obtain the decrypted session key.

31. The identification service device as described in claim 30, wherein the processor is further configured to:
maintain the identifying information of the first device; and
maintain the public key of the first device and a private key of the first device for the first device.

32. The identification service device as described in claim 30, wherein the processor is further configured to:
in response to a determination that the identification service device determines that the identifying information of the first device is not legitimate or the public key of the first device corresponding to the identifying information of the first device does not exist, send back to the second device a response indicating that the identifying information of the first device is not legitimate.

33. The identification service device as described in claim 30, wherein the processor is further configured to:
determine whether the identifying information of the first device is legitimate and the public key of the first device exists; and
in response to a determination that the identifying information of the first device is legitimate and a public key of the first device exists, locate the public key of the first device based on the identifying information of the first device.

34. A computer program product being embodied in a tangible non-transitory computer readable storage medium and comprising computer instructions for:
receiving, using a first device, an encrypted session key sent by a second device, wherein the first device includes a client, a secure service module, and a trusted environment, wherein the client corresponds to an application, and wherein the secure service module corresponds to an operating system;
decrypting, based on a private key of the first device, the encrypted session key in the trusted environment to obtain a decrypted session key, comprising:
sending the encrypted session key to the trusted environment, wherein the trusted environment includes a trusted chip, or a secure environment isolated using a virtualization mechanism, wherein the sending of the encrypted session key to the trusted environment comprises:
sending, using the client, the encrypted session key to the secure service module; and
requesting, using the secure service module, that the trusted environment decrypt the encrypted session key; and
decrypting, in the trusted environment, the encrypted session key to obtain the decrypted session key, comprising:
acquiring, in the trusted environment, the private key; and
decrypting, in the trusted environment, the encrypted session key using the private key to obtain the decrypted session key; and
conducting, based on the decrypted session key, data communication with the second device.

35. A computer program product being embodied in a tangible non-transitory computer readable storage medium and comprising computer instructions for:
acquiring, using a second device, a public key of a first device, wherein the first device includes a client a secure service module and a trusted environment wherein the client corresponds to an application, and wherein the secure service module corresponds to an operating system;
encrypting, using the second device, a session key using the public key of the first device to obtain an encrypted session key;
sending, using the second device, the encrypted session key to the first device to cause the first device to:
receive the encrypted session key sent by the second device;
decrypt, based on a private key of the first device, the encrypted session key in the trusted environment of the first device to obtain a decrypted session key, comprising to:
send the encrypted session key to the trusted environment, wherein the trusted environment includes a trusted chip, or a secure environment isolated using a virtualization mechanism, wherein the sending of the encrypted session key to the trusted environment comprises to:
send, using the client, the encrypted session key to the secure service module; and
request, using the secure service module, that the trusted environment decrypt the encrypted session key; and
decrypt, in the trusted environment, the encrypted session key to obtain a decrypted session key, comprising to:
acquire, in the trusted environment, the private key; and
decrypt in the trusted environment the encrypted session key using the private key to obtain the decrypted session key; and
conducting, using the encrypted session key, data communications with the first device.

36. A computer program product being embodied in a tangible non-transitory computer readable storage medium and comprising computer instructions for:
receiving, using an identification service device, identifying information of a first device sent by a second device, wherein the first device includes a client, a secure service module, and a trusted environment, wherein the client corresponds to an application, and wherein the secure service module corresponds to an operating system; and
sending back a public key of the first device to the second device, the second device being configured to:
encrypt a session key with the public key of the first device to obtain an encrypted session key; and
send the encrypted session key to the first device to cause the first device to:
decrypt, based on a private key of the first device, the encrypted session key in the trusted environment of the first device to obtain a decrypted session key, comprising to:
send the encrypted session key to the trusted environment, wherein the trusted environment includes a trusted chip, or a secure environment isolated using a virtualization mechanism, wherein the sending of the encrypted session key to the trusted environment comprises to:
send, using the client, the encrypted session key to the secure service module; and
request, using the secure service module, that the trusted environment decrypt the encrypted session key; and decrypt, in the trusted environment, the encrypted session key to obtain a decrypted session key, the decrypted session key being used for data communication between the first device and the second device, wherein the decrypting of the encrypted session key comprises to:

acquire in the trusted environment the private key; and decrypt, in the trusted environment, the encrypted session key using the private key to obtain the decrypted session key.

* * * * *